United States Patent [19]

Bilhorn

[11] 4,197,635

[45] Apr. 15, 1980

[54] METHOD OF MAKING A ZINC ELECTRODE

[75] Inventor: John M. Bilhorn, Stonington, Conn.

[73] Assignee: Yardney Electric Corporation, Pawcatuck, Conn.

[21] Appl. No.: 901,547

[22] Filed: May 1, 1978

[51] Int. Cl.$^2$ .................. H01M 4/42; H01M 4/66
[52] U.S. Cl. .................. 29/623.5; 29/623.3; 429/229
[58] Field of Search .................. 29/623.5, 623.3, 623.4, 29/623.1, 623.2, 730; 427/115, 123, 359, 360, 194, 195; 429/229, 230, 231

[56] References Cited

U.S. PATENT DOCUMENTS

| 2,582,744 | 1/1952 | Brennan | 427/123 |
|---|---|---|---|
| 2,738,375 | 3/1956 | Schlotter | 429/231 |
| 2,844,641 | 7/1958 | Lang et al. | 29/623.3 |
| 2,955,146 | 10/1960 | Vogt | 29/623.5 |
| 3,009,979 | 11/1961 | Corren et al. | 429/217 |
| 3,067,469 | 12/1962 | Yarrison | 427/194 |
| 3,082,278 | 3/1963 | Doyen | 429/229 |
| 3,785,868 | 1/1974 | Devitt | 429/230 |
| 3,923,544 | 12/1975 | Berchielli | 429/229 |
| 4,086,404 | 4/1978 | Vissers et al. | 429/220 |
| 4,110,519 | 8/1978 | Nilsson | 29/623.5 |

Primary Examiner—Daniel C. Crane
Attorney, Agent, or Firm—Donald E. Nist

[57] ABSTRACT

The improved method of the present invention comprises mixing zinc particles comprising zinc metal and/or zinc oxide with a concentration of bonding agent sufficient to bond the particles together when subject to mechanical roller pressure so as to form a continuous film but insufficient to totally encapsulate the particles, treating the resultant mixture to form a freely flowable doctorable powder of mesh size below about 40 mesh, doctoring the powder to a desired thickness on a conveyor, rolling the doctored powder in a nip between pressure rollers to form a continuous film, combining the film with a current collector and then dividing the resultant film into zinc electrodes of predetermined size.

In carrying out the method, the current collector may be passed into the pressure nip along with the doctored powder during formation of the film. If desired, the current collector can be placed on the layer of doctored powder and then a second layer of the powder can be disposed on the free side of the current collector, and then doctored before this composite passes through the pressure nip to form the desired product. In another embodiment, two of the rolled films can be independently formed and then the current collector can be placed therebetween, and the resultant composite can then be passed through a pressure nip to unify the composite. The electrode is thus formed in a relatively simple, rapid, flexible and efficient manner.

2 Claims, 7 Drawing Figures

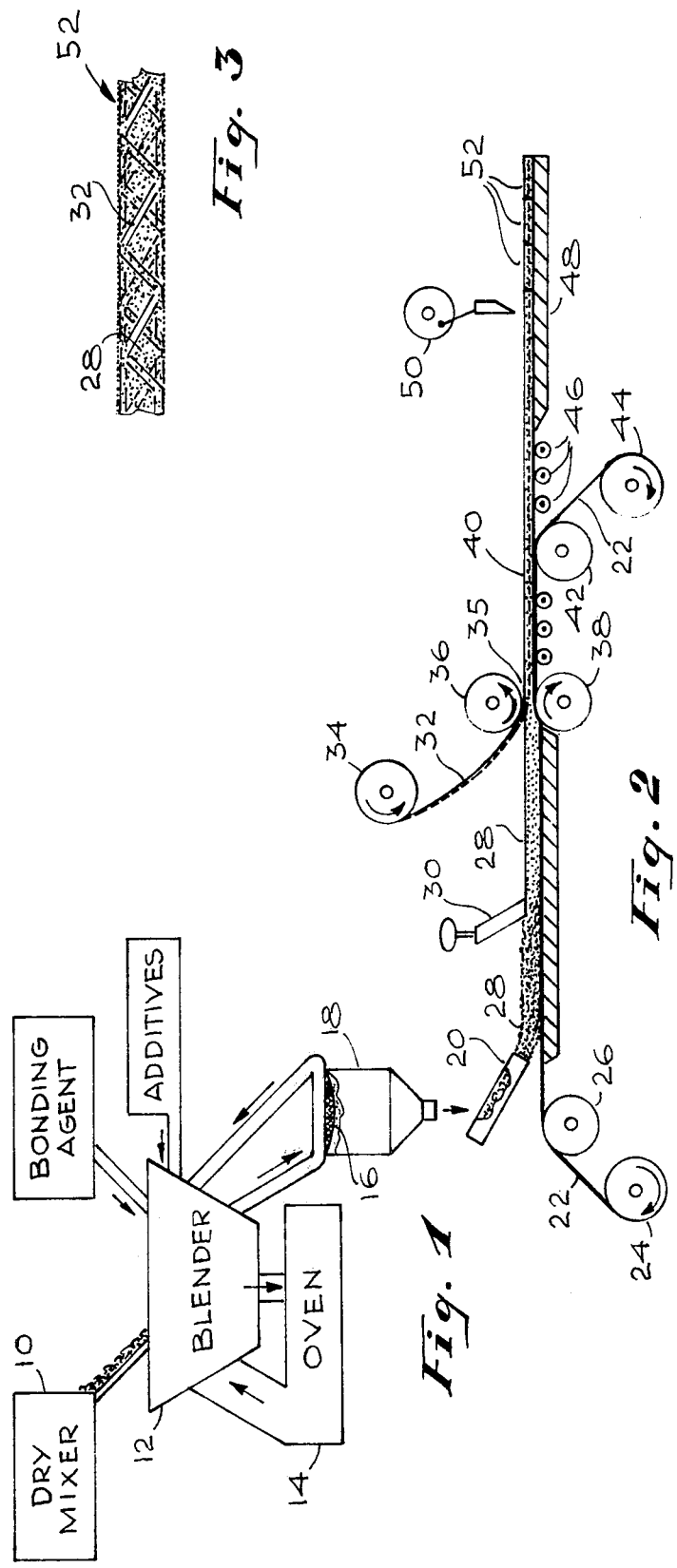
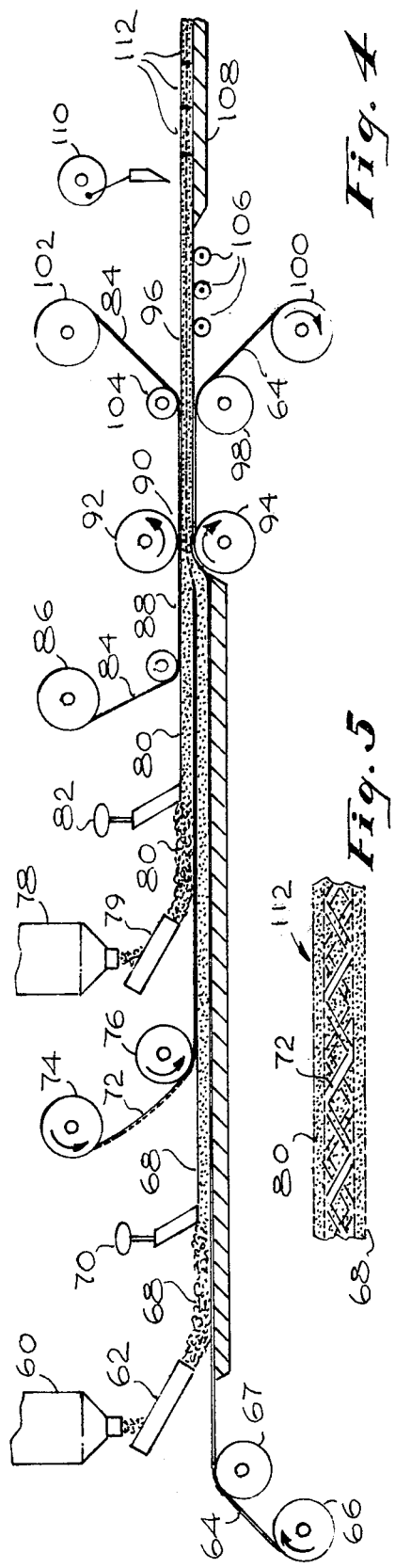

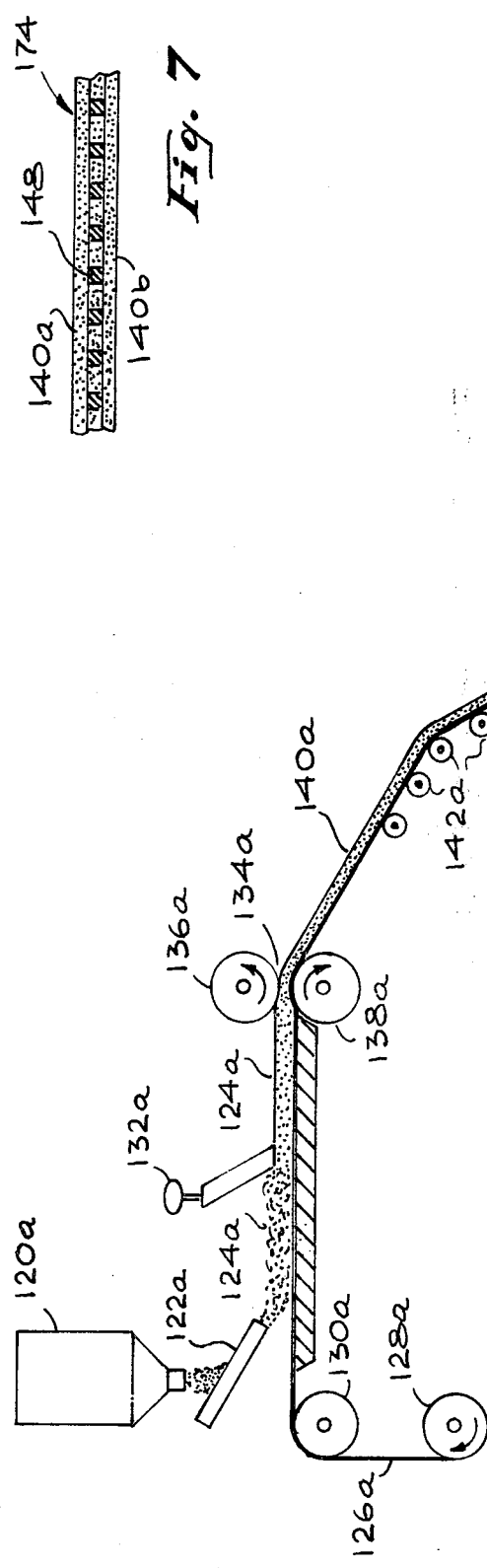
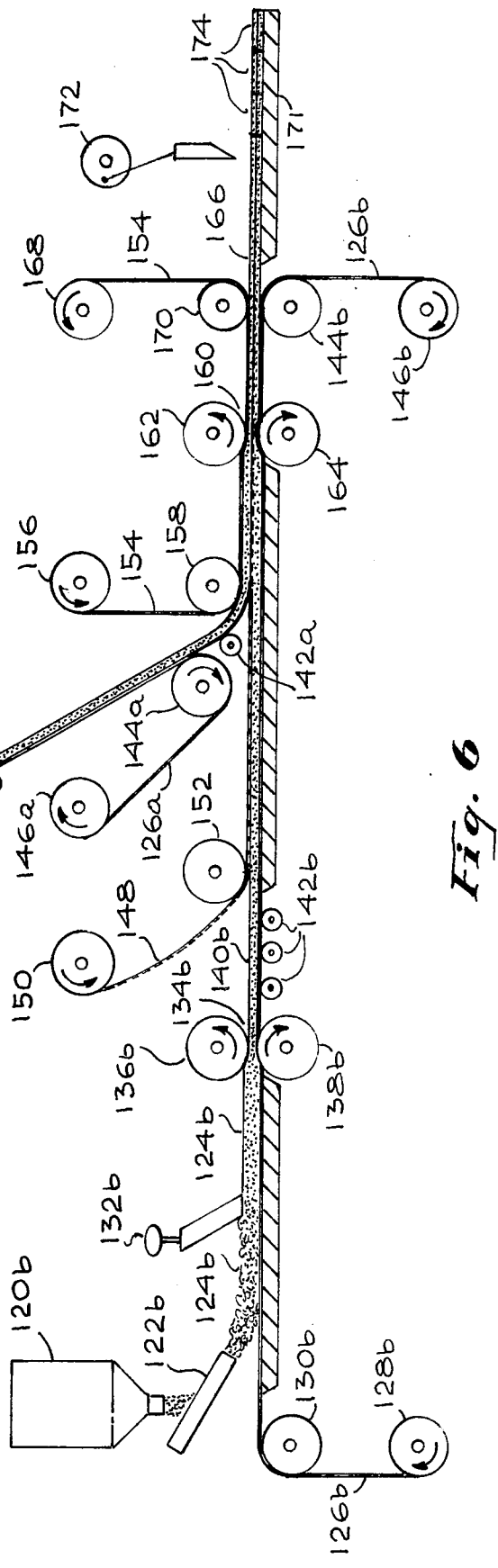
Fig. 7
Fig. 6

4,197,635

METHOD OF MAKING A ZINC ELECTRODE

BACKGROUND OF THE INVENTION

1. Field of the Invention

The present invention generally relates to electrodes and more particularly to an improved method of making zinc electrodes.

2. Prior Art

Various methods have been utilized for the commercial manufacture of zinc electrodes. All of such methods have drawbacks as to costs, materials, quality of product and the like. For example, zinc electrodes can be made by electrodeposition procedures. However, such procedures include a number of steps, require substantial amounts of manufacturing equipment including racks, baths, charging apparatus and the like, and result in a considerable expenditure of energy, time and money per unit of product. Zinc electrodes manufactured by electroforming methods are generally subject to the same deficiences. Zinc electrodes have also been manufactured by procedures which involve the use of dilute slurries, the formation of pastes from the slurries and other steps which involve large expenditures of energy. Moreover, the equipment necessary for carrying out these techniques is relatively bulky and expensive.

Accordingly, there is a need for an improved method of making zinc electrodes in a more efficient, energy-conserving, less expensive commercially adaptable manner. The finished electrodes should be equal to or exceed in quality those made by conventional commercial procedures. The method should not require extensive steps and equipment and should be amenable to various modifications in order to readily produce electrodes with specialized characteristics, as needed.

SUMMARY OF THE INVENTION

The present invention satisfies the foregoing needs. The improved method of the present invention is substantially as set forth in the Abstract above. The method is designed to overcome the deficiencies of prior art commercial methods of forming zinc electrodes. The present method involves the preparation of a powder which is relatively dry and freely flowable and can be readily doctored on a conveyor such as a carrier paper or the like and then compressed by simple mechanical pressure exerted in a nip between two unheated press rollers to form a continuous yet liquid-porous film capable of readily absorbing alkaline electrolyte and the like. The film is formed without necessitating the use of heat and electrical energy.

In accordance with the method of the present invention, zinc powder in the form of zinc metal and/or zinc oxide is mixed with a bonding agent preferably of natural or synthetic rubber of the neoprene, acrylic, butyl or the like type in latex form, the bonding agent being in a minor concentration sufficient to bond the powder particles together but insufficient to encapsulate them. Such minor concentration is usually about 0.5–5 percent by weight of the powder-bonding agent mixture. The latex comprises a dispersion of rubber globules in water. The dispersant (water) must be subsequently removed. Such removal can be by evaporation in an oven or the like. The dried mixture is then comminuted to reduce the average particle size of the powder to under about 40 U.S. standard mesh. The freely flowable mixture is then passed to a traveling carrier sheet or belt, is doctored on the carrier to control its thickness, and then passed into the nip between a pair of pressure rolls to mechanically press the mixture into a continuous porous film.

The current collector is in the form of a flexible metallic mesh or punched foil grid or the like, preferably copper, silver or the like and is preferably placed on the doctored powder layer before it reaches the nip, or passes with that layer directly into the nip so that it becomes integrated with the film. The resultant composite is then divided into proper lengths to form the desired electrodes. If desired, the current collector can be laid on one doctored layer of the powder whereupon a second layer of the powder can be disposed on the free surface of the current collector, then doctored, and then the resulting composite can be compressed in the pressure nip to form the desired integrated product. In another embodiment, two separate doctored layers of the powder are first separately compressed to form two films, which are then approximated. The current collector is then placed therebetween before final compression and bonding together of the sandwich in the nip of a third set of pressure rollers.

It will be seen that the present method is adaptable to a number of particular techniques so that electrodes of specialized type can be formed as desired. The method is nevertheless simple, rapid, inexpensive and efficient and does not require the use of either heat or electrical energy to provide the desired product. Various other features of the present invention are set forth in the following detailed description and the accompanying drawings.

DRAWINGS

FIG. 1 is a schematic flow diagram illustrating the preparation of a doctorable powder in accordance with the present method;

FIG. 2 is a schematic flow diagram illustrating a first preferred embodiment of the milling steps of the present method being carried out on suitable equipment utilizing the doctorable powder of FIG. 1;

FIG. 3 is an enlarged schematic fragmentary cross-section of a portion of a zinc electrode manufactured in accordance with the method of FIG. 2;

FIG. 4 is a schematic flow diagram depicting a second preferred embodiment of the milling steps of the method of the present invention being carried out on suitable equipment, utilizing the doctorable powder of FIG. 1;

FIG. 5 is an enlarged schematic fragmentary cross-section of a portion of a zinc electrode manufactured in accordance with the method of FIG. 4;

FIG. 6 is a schematic flow diagram depicting a third preferred embodiment of the milling steps of the method of the present invention being carried out on suitable equipment, utilizing the doctorable powder of FIG. 1; and, FIG. 7 is an enlarged schematic fragmentary cross-section of a portion of an electrode manufactured in accordance with the method of FIG. 6.

DETAILED DESCRIPTION

It will be understood that the method of the present invention can be carried out in a number of modes utilizing any suitable equipment which allows the performance of the necessary steps called for in the present method. These steps include mixing of selected starting materials and treating the same to form a freely flowable doctorable powder, doctoring the powder to desired thickness on a conveyor and rolling the doctored powder together with a current collector in a pressure nip between pressure rollers to form a continuous liquid-porous film. The film is then divided into a plurality of the desired zinc electrodes.

Now referring more particularly to FIG. 1 of the accompanying drawings, a schematic flow diagram is presented illustrating the preparation of a doctorable powder forming part of and utilized in the present method. In accordance with the method, zinc particles, preferably in finely divided powder form, and selected from the group consisting of zinc metal, zinc oxide and mixtures thereof can be used as starting materials. Normally, both zinc metal powder and zinc oxide powder are present in any suitable proportion, thus requiring the dry mixer 10 shown in FIG. 1 to thoroughly mix the same therein. If, for example, zinc metal powder alone is used, then mixer 10 is not required.

In any event, in the embodiment shown in FIG. 1, the contents of dry mixer 10 are passed into a blender 12, and blended therein with a suitable bonding agent. The bonding agent may be in a latex form, for example, neoprene latex, acrylic rubber latex, butyl rubber latex, or the like, and is present in a minor concentration sufficient to bond the particles together but insufficient to totally encapsulate them. Other bonding agents can be used, for example, teflon powders, or crude synthetic rubbers in dispersions in such organics as chloroform (such rubbers being sold under trademarks such as Kraton, a registered trademark of Shell Chemical Co.). Normally, the bonding agent is present in a concentration of about 0.5–5% by weight of the total mixture of the zinc powder and bonding agent. In order to more easily mix the bonding agent with the powder, the bonding agent may be present in a suitable dispersant. For example, when the bonding agent is in a latex form, it may be diluted with deionized water to a volume concentration of up to about 10% solids and 90% water.

The mixture in blender 12 can also include any other desirable material such as, for example, a gas control agent such as mercuric oxide or the like in particle form. The concentration of the mercuric oxide may be, for example, about 0.5–3% by weight.

The contents of blender 12 when uniformly mixed together, are then passed to trays (not shown) in an oven 14 and dried therein to remove dispersant and to allow the bonding agent to set. The dried product is then recirculated to blender 12 or to another blender (not shown) or other container having grinding means such as an intensifier bar (not shown) to break up any agglomerates formed by the bonding agent and to reduce the dried material to very finely divided freely flowable form. This finely divided material is then passed to a screen 16 of, for example, 40 U.S. standard mesh size or finer supported on a holding container 18 or the like. Material, which passes through the screen 16 drops into container 18, while material which does not pass through screen 16 is recycled to blender 12 for regrinding.

FIG. 2

A first preferred embodiment of the milling steps of the present method is set forth schematically in FIG. 2. In accordance with the method, the finely divided material prepared as per FIG. 1 passes from container 18 through a chute 20 to the surface of a traveling conveyor belt 22 of paper, rubber, or the like, being taken from roll 24 around guide roll 26. The thickness of the resulting layer 28 of powdered material on belt 22 is controlled by a vibrating doctor blade 30 or the like. As the doctored layer 28 passes downstream of blade 30, it is combined with a current collector comprising a flexible strip of conductive material such as silver, copper or the like, in the form of a mesh or a punched foiled grid 32 being unwound from drum 34. Grid 32 is placed, as shown in the embodiment of FIG. 2, on the top of doctored layer 28 and the resulting sandwich is passed into a nip 35 provided by rollers 36 and 38 while still supported on belt 22.

Nip 35 compresses the sandwich so that grid 32 is firmly embedded in layer 28 to form the desired composite. It will be understood that this formation takes place without the necessity of elevated temperature, and is due to the pressure exerted at nip 35 together with the adhesive properties of the bonding agent utilized in layer 28. In any event the resulting composite is in the form of a unitary continuous film 40 which is supported on belt 32 until belt 32 passes therefrom around takeup and guide rolls 42 and 44 and is then supported on rollers 46 and/or shelf 48 as it passes under a reciprocating knife blade 50 which cuts film 40 into desired lengths to form finished individual self-supporting zinc electrodes 52.

A typical configuration of a zinc electrode 52 is shown in part in enlarged fragmentary schematic cross-section in FIG. 3. Thus, electrode 52 includes grid 32 with particles of layer 28 embedded in the interstices therein and surrounding grid 32. Electrode 52 is self-supporting, efficient and economical to make. Thus, it can be made rapidly and uniformly with a minimum of effort and a minimum of expense of materials and labor. It will be understood that the concentration and distribution of bonding agent in electrode 52 is controlled so that the surfaces of electrode 52 are porous to liquid, thereby allowing penetration of electrolyte thereinto for more efficient operation of an electrochemical cell which employs such an electrode. For this purpose, the bonding agent preferably is introduced into the mix in latex form and preferably does not exceed about 5 wt.% solids of the mixture of the zinc powder and latex.

FIGS. 4 and 5

FIG. 4 is a schematic flow diagram illustrating a second preferred embodiment of the milling steps of the method of the present invention. In the embodiment of FIG. 4, in contrast to the embodiment set forth in FIG. 2, a double layer (instead of a single layer) of flowable doctored material obtained as per FIG. 1 is disposed on opposite sides of a current collector before passing the resulting sandwich into a pressure nip. This material is a freely, flowable, doctorable powder comprising zinc particles selected from the group consisting of zinc metal, zinc oxide and mixtures thereof thoroughly blended with bonding agent as previously described in a suitable concentration (about 0.5–5 wt.%) with or without additives and preliminary mixing. The resultant blend is then dried to remove dispersant, if present, ground to reduce agglomerates to small size and screened to provide the desired freely flowable, doctorable starting powder.

The powder is then passed to container 60 and through chute 62 onto a traveling conveyor belt 64 being unwound from roll 66 and trained around roll 67. The powder on belt 64 in a layer 68 is then doctored by a vibrating doctor blade 70 to a desired thickness. As layer 68 passes downstream, of blade 70 on belt 64, a flexible grid 72 (being unwound from a roll 74 and trained past a guide roll 76) is laid on the upper surface of layer 68.

A second container 78 which contains a freely flowable doctorable powder having any desired concentration of zinc metal and/or zinc oxide particles and bonding agent, with or without additive such as a gas control agent, for example, mercuric oxide, and which has been thoroughly blended together and deagglomerated and screened as previously described, is disposed downstream of roller 76. It will be understood that the composition of this powder may be different from that in container 60. The doctorable powder passes from container 78 and chute 79 and is deposited as a layer 80 on top grid 72, whereupon layer 80 is doctored by vibrating doctor blade 82 to a desired thickness. A flexible protective cover sheet 84, for example of a release type paper or the like, taken from roll 86 and trained around roll 88 can be disposed on the top of doctored layer 80 before the resulting sandwich passes into a pressure nip 90 between pressure rolls 92 and 94. The sandwich includes sheet 84, layer 80, grid 72, layer 68 and belt 64.

In pressure nip 90 the sandwich is compressed to form a continuous composite film 96 with grid 72 centered in the film. As film 96 passes downstream, belt 64 is removed therefrom by being trained around roll 98 and passed to roll 100. Similarly, sheet 84 can be taken up on roll 102 after passing around roll 104. Downstream of this point, the continuous composite film 96 may be supported on rollers 106 and/or shelf 108 until it passes under reciprocating knife blade 110 which slices film 96 into individual zinc electrodes 112 of desired size.

FIG. 5 schematically depicts in enlarged fragmentary cross-section the construction of electrode 112. Thus, FIG. 4 shows grid 72 embedded in and between layers 68 and 80 and containing the porous material of layers 68 and 80 in the interstices thereof. Although electrode 112 is somewhat different in arrangement of components than electrode 52, it is still as porous, efficient, inexpensive and as durable, and it provides the other features and advantages previously described.

FIGS. 6 and 7

FIG. 6 is a flow diagram schematically illustrating a third preferred embodiment of the milling steps of the present method.

In the embodiment illustrated in FIG. 6, two continuous films of electrode material are first separately formed under pressure from doctorable powder, such as is provided in FIG. 1, and are then combined under pressure with a current collector after passing the latter therebetween. The resulting composite is a single unified film.

Now referring again to FIG. 6, a pair of containers 120a and 120b each provide freely flowable doctorable material, as per FIG. 1, to chutes 122a and 122b so as to form layers 124a and 124b on traveling belts 126a and 126b passing from rolls 128a and 128b around rolls 130a and 130b. The powders are of the general composition previously described and preferably are below about 40 U.S. standard mesh size.

Belts 126a and 126b carry their respective layers 124a and 124b to and under vibrator doctor blades 132a and 132b and thereafter into pressure nips 134a and 134b between, respectively, pressure rollers 136a and 138a (in the one case) and 136b and 138b (in the other case) to form continuous films 140a and 140b. The pressures exerted by nips 134a and 134b can be any suitable forces, for example, about 5 to about 100 tons, and will vary, depending on the particle size, bonding agent, etc. Such forces can also be used in the nips described in connection with FIGS. 2 and 4.

Films 140a and 140b are then passed on support rollers generally designated as 142a and 142b into close proximity with each other. In the case of film 140a, belt 126a is first removed from contact therewith around rollers 144a and 146a and a current collector in the form of a flexible grid 148 is passed between films 140a and 140b from roller 150 around rollers 152, whereupon a protective flexible sheet 154 of a release type paper or the like is passed from roll 156 around roll 158 into contact with the top of film 140a.

The resulting sandwich comprising sheet 154, film 140a, grid 148, film 140b and belt 126b is passed into a pressure nip 160 between rolls 162 and 164 so as to compress the same into a finished product in the form of a continuous self-supporting film 166. The force exerted in the nip can be, for example, about 2 to about 60 tons. Conveyor belt 126b is then taken up on roll 146b after passage around roll 144b and sheet 154 is taken up on roll 168 after passage around roll 170, whereupon film 166, while it is supported on shelf 171, is sliced into suitable lengths by reciprocating knife blade 172 to form individual electrodes 174.

The configuration of a typical electrode 174 is shown in enlarged fragmentary schematic cross-section in FIG. 7 to include grid 148 disposed between films 140a and 140b. This electrode 174 has all the advantages and characteristics of electrodes 52 and 112 as previously described.

The following specific examples further illustrate certain features of the present invention.

EXAMPLE I

Improved zinc electrodes were made in accordance with the method of the present invention utilizing an admixture comprising 86 wt.% of zinc oxide powder having a particle size of about 0.4–0.7 microns, 10 wt.% of zinc metal powder having a particle size distribution of about 75% 20–40 microns, 20% 60–100 microns, 5% 100–150 microns, 3 wt.% (solids) of neoprene supplied in latex form of a 10% by weight concentration in deionized water, and 1 wt.% of mercuric oxide as a gas control agent. The zinc-containing materials were first dry mixed together and then the latex in its dispersant was added to the dry mixture in a blender. Blending was carried out for approximately 20 minutes after which the resultant moist mix was dried in pyrex drying trays in a circulating oven for 16 hours at 70° C. The resultant dried cake was then broken up in a blender with an intensifier bar over a period of one hour. The mercuric oxide was added to the blender before the breaking up of the cake. The resultant mix was then screened and those particles below 40 mesh (U.S. standard mesh) particle size were used for the present method. The oversized particles were recycled for future grinding. Rolling of the properly sized particles was performed while the particles were in a layer, which, after doctoring, was about 0.10 inches thick. During the rolling which took place in a two roll pressure nip an expanded metal grid was in contact in the nip with the powdered layer so that the grid became embedded into the powder. The grid comprised a perforated copper foil having a thickness of approximately 0.002 inches and a weight per unit area of about 0.2 g/in². The force in the nip was 17.4 tons so that the resulting continuous self-supporting film formed in the nip had a density of approximately 2.5 grams of zinc per cc. This film was then cut into zinc electrodes approximately 8 inches long, 3 inches wide, and 0.030 inches thick. The electrodes were found to be porous, that is, porous to electrolyte, yet durable and efficient when utilized in electrochemical cells. Moreover, the method was relatively inexpensive and rapid and produced electrodes of uniform characteristics.

EXAMPLE II

Zinc electrodes were made in accordance with the method of the present invention from an admixture having 97% by weight of zinc metal powder having a particle size distribution of about approximately 75% 20–40 microns, 20% 60–100 microns, 5% 100–150 microns, 3 wt.% (solids) of neoprene binder and 1 wt.% of mercuric oxide having a particle size of 7–12 microns. The neoprene was added as a latex of 10% by weight dispersion in deionized water. These materials were mixed, dried, ground and screened as specified in Example I and then the resulting powder was disposed as a layer on a traveling belt. The layer was doctored to provide an initial thickness of about 0.060 inches, after which a grid of copper foil punched in a hatterscone pattern with 46% open area with an average foil thickness of about 0.002 inches was placed on the top of the doctored layer after which a second layer of the same powder was disposed on the grid's upper surface and doctored to an average thickness of about 0.060 inches whereupon the resulting sandwich was passed into a pressure nip between two 10½" dia. hardened steel rolls spaced to provide the sandwich with a density of about 4.5 grams of zinc per cc. The nip exerted a force of about 56 tons and the product was in the form of a continuous self-supporting film about 0.040 inches thick and about 6 inches wide. This film was then cut into 4 inch lengths to form individual zinc electrodes.. The electrodes were found to be porous to electrolyte, durable and efficient.

EXAMPLE III

Electrodes were made in accordance with the present method from an admixture having 86 wt.% of zinc oxide having a particle size of 0.4–0.7 microns, 10 wt.% of zinc metal particles having a particle size distribution of about 75% 20–40 microns, 20% 60–100 microns, 5% 100–150 microns, 3 wt.% (solids) of neoprene binder and 1 wt.% of mercuric oxide of 7–12 microns particle size. The binder was added as a latex dispersion of about 6.25 wt. % in deionized water. The materials were mixed, blended, ground and screened in the manner described in Example I. The resulting freely flowable doctorable powder was passed onto a moving belt of paper, doctored to a thickness of about 0.080 inches and then compressed under about 21 tons force in a two roll nip to a density of 2.4–2.7 grams zinc per cc. of film. The resultant film was then sliced into lengths and a sandwich was made comprising an expanded silver metal mesh of approximately 0.025 inch thickness with approximately 65% open area disposed between 2 lengths of the film. The sandwich was disposed on a moving transfer paper belt and passed into the nip between two rolls to compress the sandwich at 30 tons force into a unitary film having a density of 3.5 grams zinc per cc. film. The film was then divided into electrodes of approximately 6 inch length, 4 inch width, and 0.030 inch thickness. The electrodes were found to be durable, efficient and porous to electrolytes. Moreover, the electrodes were simple and inexpensive to manufacture.

The following table sets forth additional test data comparing electrodes made in accordance with the present method with typical electrodes made by conventional electro-forming and electro-deposition methods. The rolled electrodes were all formed from powder containing 97 wt.% zinc metal, 1 wt.% mercuric oxide and 2 wt.% binder.

TABLE

| Binder | Density, g/cc | Method | Utilization of Zinc, AH/g |
|---|---|---|---|
| Neoprene (Latex) | 4.65 | Rolled | .556 |
| Neoprene (Latex) | 4.45 | Rolled | .690 |
| Neoprene (Latex) | 4.25 | Rolled | .625 |
| Neoprene (Latex) | 3.35 | Rolled | .645 |
| Butyl (Latex) | 2.65 | Rolled | .645 |
| Acrylic (Latex) | 4.95 | Rolled | .690 |
|  | 1.95 | Electro formed | .571 |
|  | 2.15 | Electrodeposited | .571 |

The table set forth above indicates that higher densities of zinc electrode material can be provided utilizing the method of the present invention in place of electro-forming or electro-depositing the electrode material. Moreover, the utilization of zinc in most cases substantially exceeds that for electro-formed and electro-deposited zinc electrodes.

It should be noted that the present invention provides novel features including an electrode with a porous structure which nevertheless is self-supporting and of relatively high density and high utilization of zinc. Moreover, the method provides an agglomerate which is sufficiently dry so as to be easily broken up into a freely flowing doctorable powder. Thus, only mechanical energy is required to form the electrode rather than heat and electrical energy in addition to mechanical energy. The method is more rapid, more uniform, simpler and of substantially lower cost than conventional procedures. The energy requirements are considerably less than in conventional procedures.

No sintering is required as in many conventional techniques, for example, that of U.S. Pat. No. 3,002,834. Nor are complicated procedures required, such as forming polytetrafluoroethylene dispersions, kneading and sheeting as called for in U.S. Pat. No. 4,022,953. In accordance with the present method, the zinc active material in the electrode is better utilized because it is accessible to the electrolyte due to the porosity of the electrode and is not encapsulated in the bonding agent and thus sealed off from the electrolyte as in many conventional procedures. The bonding agent is selected so that it will form a freely flowable doctorable powder with the zinc particles when agglomerates are broken up. The bonding agent will also form the continuous liquid-porous film with the zinc particles merely upon application of mechanical pressure.

It should be understood that certain of the steps utilized in the preparation of the freely flowable doctorable powder used in the present method can be eliminated under certain circumstances. For example, if no dispersant is used with the bonding agent, drying of the mixture in an oven can be eliminated. As previously pointed out, if both zinc oxide and zinc metal are not utilized but only one of those two materials, the dry mixing step can be eliminated. Various other changes, alterations, modifications and additions can be made in the present method, its steps and parameters. All such changes, modifications, alterations and additions as are within the scope of the appended claims form part of the present application.

I claim:

1. An improved method of making a zinc electrode for an electrochemical cell, which method comprises:
   a. mixing zinc particles selected from the group consisting of zinc metal, zinc oxide and mixtures thereof with a concentration of bonding agent sufficient to form said particles into a continuous film but insufficient to totally eccapsulate the particles;
   b. treating the resultant mixture of zinc particles and bonding agent to form a dry and freely flowable doctorable powder;
   c. doctoring said dry powder to a desired thickness on a conveyor;
   d. disposing a current collector on said doctored powder, disposing a second layer of said powder on the free side of said current collector and doctoring said second layer of powder;
   e. passing said two doctored layers of powder with said current collector therebetween into a pressure nip between pressure rollers at ambient temperature to form two continuous liquid-porous films from said powder and to combine said films with said current collector; and,
   f. dividing said composite into zinc electrodes of desired size.

2. An improved method of making a zinc electrode for an electrochemical cell, which method comprises:
   a. mixing zinc particles selected from the group consisting of zinc metal, zinc oxide and mixtures thereof with a concentration of bonding agent sufficient to form said particles into a continuous film but insufficient to totally encapsulate the particles;
   b. treating the resultant mixture of zinc particles and bonding agent to form a dry and freely flowable doctorable powder;
   c. doctoring said dry powder to a desired thickness on a conveyor;
   d. at ambient temperature rolling said doctored powder in a pressure nip between pressure rollers to form a continuous liquid porous film;
   e. doctoring a separate second layer of said dry powder to a desired thickness on a conveyor and rolling at ambient temperature said doctored second layer of said powder in a pressure nip between pressure rollers to form a second continuous liquid porous film;
   f. placing a current collector between said two films and passing the resultant composite through a pressure roller nip to unify said composite; and,
   g. dividing said composite into zinc electrodes of desired size.

* * * * *